US012595890B2

(12) United States Patent
Buechner et al.

(10) Patent No.: US 12,595,890 B2
(45) Date of Patent: Apr. 7, 2026

(54) LIGHTING DEVICE FOR VEHICLES

(71) Applicant: HELLA GmbH & Co. KGaA, Lippstadt (DE)

(72) Inventors: Arnd-Claus Buechner, Lippstadt (DE); Florian Herold, Bielefeld (DE); Alexander Schwan, Kamen (DE); Sebastian Voelker, Delbrueck (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 0 days.

(21) Appl. No.: 18/825,782

(22) Filed: Sep. 5, 2024

(65) Prior Publication Data

US 2025/0075872 A1 Mar. 6, 2025

(30) Foreign Application Priority Data

Sep. 5, 2023 (DE) ..................... 10 2023 123 851.5

(51) Int. Cl.
*F21S 41/67* (2018.01)
*F21S 41/148* (2018.01)
(Continued)

(52) U.S. Cl.
CPC ............. *F21S 41/67* (2018.01); *F21S 41/148* (2018.01); *F21S 41/25* (2018.01); *F21S 41/365* (2018.01); *F21S 41/37* (2018.01); *F21V 19/001* (2013.01)

(58) Field of Classification Search
CPC .......... F21S 41/67; F21S 41/365; F21S 41/37; F21S 41/321; F21S 41/25; F21S 41/26;
(Continued)

(56) References Cited

U.S. PATENT DOCUMENTS 11,022,266 B2 * 6/2021 Hermitte ............... F21S 41/148
2015/0043236 A1 * 2/2015 Yamamoto ............. F21S 41/19 362/516
(Continued)

FOREIGN PATENT DOCUMENTS

DE 102014111445 A1 2/2016
EP 3798507 A1 * 3/2021 ............ F21S 41/663
(Continued)

OTHER PUBLICATIONS

Search English translation of WO 2023277071 A1 (Year: 2023).*
Search English translation of EP 3798507 A1 (Year: 2021).*

*Primary Examiner* — Omar Rojas Cadima
(74) *Attorney, Agent, or Firm* — Muncy, Geissler, Olds & Lowe, P.C.

(57) ABSTRACT

A lighting device for vehicles having a light source unit and having an optical unit that contains a reflector with at least one reflector surface for creating a specified light distribution, wherein the light source unit has a first light source that is arranged in a focal point region of the reflector surface. A second light source is arranged outside the focal point region of the reflector surface. A lens is arranged ahead of the reflector surface in the direction of light emission. The second light source is arranged outside the focal point region such that the light emitted by the second light source strikes a lens segment of the lens which a light emitted by the first light source and reflected by the reflector surface does not strike, so that all lens segments of the lens are illuminated.

16 Claims, 3 Drawing Sheets

(51) Int. Cl.

| | |
|---|---|
| ***F21S 41/25*** | (2018.01) |
| ***F21S 41/365*** | (2018.01) |
| ***F21S 41/37*** | (2018.01) |
| ***F21V 19/00*** | (2006.01) |

(58) Field of Classification Search

CPC ...... F21S 41/255; F21S 41/148; F21S 41/151; F21S 41/663; F21S 41/33; F21S 41/331; F21S 41/332; F21S 41/334; F21S 41/335; F21S 41/336; F21S 41/337; F21S 41/338; F21S 41/333; F21S 41/36; F21S 41/147; F21S 41/153; F21S 43/14; F21S 43/145; F21S 43/15; F21V 19/001; F21W 2105/00; F21W 2102/13; F21W 2103/55; F21W 2107/10; F21W 2102/30; F21W 2102/135; F21W 2102/165; F21W 2103/10; F21W 2103/60; F21W 2104/00

See application file for complete search history.

(56) References Cited

U.S. PATENT DOCUMENTS

| | | | |
|---|---|---|---|
| 2021/0231279 | A1 | 7/2021 | Ohashi et al. |
| 2024/0102626 | A1 | 3/2024 | Laminette et al. |

FOREIGN PATENT DOCUMENTS

| | | | | |
|---|---|---|---|---|
| JP | 2017016784 | A | 1/2017 | |
| WO | WO2022129426 | A1 | 6/2022 | |
| WO | WO-2023277071 | A1 * | 1/2023 | ............ F21S 41/143 |

* cited by examiner

LIGHTING DEVICE FOR VEHICLES

This nonprovisional application claims priority under 35 U.S.C. § 119 (a) to German Patent Application No. 10 2023 123 851.5, which was filed in Germany on Sep. 5, 2024, and which is herein incorporated by reference.

BACKGROUND OF THE INVENTION

Field of the Invention

The invention relates to a lighting device for vehicles having a light source unit and having an optical unit that contains a reflector with at least one reflector surface for creating a specified light distribution, wherein the light source unit has a first light source that is arranged in a focal point region of the reflector surface and has a second light source that is arranged outside the focal point region of the reflector surface.

Description of the Background Art

A lighting device for vehicles having a light source unit and having an optical unit is known from DE 10 2014 111 445 A1, which is incorporated herein by reference, and which has two different light sources for creating different light distributions, with a common reflector surface associated with these light sources. A first light source is arranged in a focal point region of the reflector so that the light emitted by the first light source is reflected in accordance with a low beam light distribution. A second light source is arranged outside the focal point region of the reflector surface, wherein an expansion of the light emitted by the second light source is accomplished via a primary optical system associated therewith and the light is deflected to form a daytime running light function via the reflector surface. The known lighting device has no lens.

SUMMARY OF THE INVENTION

It is therefore an object of the present invention to improve a lighting device for vehicles in such a manner that an illuminated area of the lighting device formed by a lens has a homogeneous appearance.

To attain this object, the invention is characterized in that a lens is arranged ahead of the reflector surface in the direction of light emission, in that the second light source is arranged outside the focal point region in such a manner that the light emitted by the second light source strikes a lens segment of the lens which a light emitted by the first light source and reflected by the reflector surface does not strike, so that all lens segments of the lens are illuminated.

A second light source can be arranged outside the focal point region of the reflector surface and can be used to illuminate regions or segments of a lens situated in front thereof that would otherwise be dark. The second light source does not provide any light that serves to create a light distribution or lighting function. The purpose of the second light source is solely to ensure that the entire lens is illuminated, so that the entire lens surface is perceived by an outside observer as a homogenous illuminated area without dark regions or stripes, regardless of the lighting function currently switched on.

The second light source can be arranged at a distance from the first light source such that the light emitted by the second light source strikes a diffused light segment of the reflector surface, which is designed such that the light of the second light source is reflected or deflected in a diffused manner, wherein it strikes at least the region of the lens that is not covered by the light emitted by the first light source. The light emitted by the first light source strikes a lighting function segment of the reflector surface, via which the light of the first light source is deflected in such a way that the specified lighting function or light distribution, for example low beam light distribution, is projected into the vehicle near field via the lens. Whereas the light of the first light source is guided and/or deflected by the lighting function segment in accordance with a specified light distribution, only a targeted diffusion of the light emitted by the second light source onto the lens takes place via the diffused light segment of the reflector surface.

A second light beam that can be formed by the light of the second light source and that is deflected by the diffused light segment has a larger aperture angle than a first light beam that is deflected at the lighting function segment of the reflector surface. Whereas the first light beam is limited to a lens segment intended for projection of the lighting function, the second light beam radiates beyond this edge of the lens segment into adjacent regions of the lens segment so that illumination of the adjacent lens segment of the lens is ensured. Consequently, the entire lens is advantageously illuminated.

The first light source and the second light source can be positioned on a common printed circuit board.

The lighting device can have multiple reflector surfaces, with each of which is associated a first light source for creating an identical or different light distribution. Associated with the different reflector surfaces are different light segments via which the corresponding light beam of the lighting function is projected onto the vehicle near field. If a first light source, in cooperation with a reflector surface and a lens segment, serves to create a high beam light distribution that is switched on only at times in addition to another lighting function, for example low beam light distribution, then the second light source is arranged at a distance from the first light source that serves to create the low beam light distribution. It is ensured by this means that the lens segment of the lens intended for the high beam light distribution is illuminated when the high beam light distribution is in the switched-off state.

The lens segments intended for projecting the different light distributions can be joined to one another as a single piece. It is ensured via the arrangement of second light sources that the entire area of the lens is illuminated when at least one lighting function is switched on.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
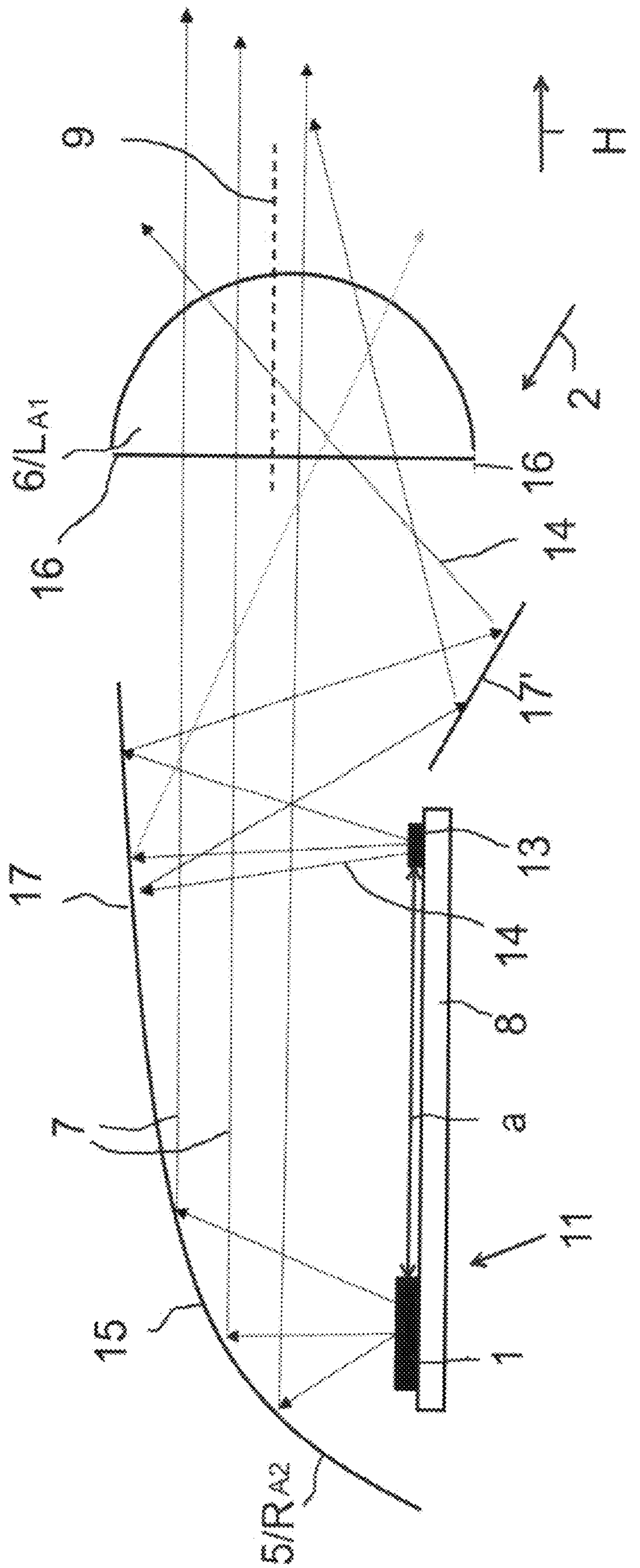
FIG. 1 shows a vertical, longitudinal section through a lighting device according to an example of the invention along the section line -I- in FIG. 2.

A lighting device for vehicles preferably is designed as a headlamp that serves to create a specified light distribution, for example low beam light distribution and/or high beam light distribution.

To create the specified light distribution, the lighting device has a multiplicity of light sources 1, 13 and an optical unit 2, which are mounted inside a housing.

The optical unit 2 includes a reflector 5 on the one hand and a lens 6 on the other hand, wherein the reflector 5 is arranged between the light sources 1, 13 on the one side and the lens 6 on the other side in the direction of light guidance.

The reflector 5 has multiple reflector surfaces $R_{A11}$, $R_{A12}$, $R_{A13}$, $R_{A2}$, $R_{B1}$, $R_{B2}$, with each of which is associated a first light source 1 for creating a specified light distribution. The first light sources 1 are each arranged in a focal point region 11 of the respective reflector surfaces $R_{A11}$, $R_{A12}$, $R_{A13}$, $R_{A2}$, $R_{B1}$, $R_{B2}$, wherein the light or light beam 7 emitted by the first light source 1 is deflected by a lighting function segment 15 of the reflector surface in accordance with the specified light distribution and strikes a lens segment $L_{A1}$, $L_{A2}$, $L_{B1}$, $L_{B2}$ of the lens 10 associated with the respective reflector surface $R_{A11}$, $R_{A12}$, $R_{A13}$, $R_{A2}$, $R_{B1}$, $R_{B2}$. In the present example, the lighting function segment 15 is arranged in a region near the apex of the reflector surface.

The lighting function segment 15 is designed such that the light beam 7 emitted by the first light source 1 strikes the corresponding lens segment $L_{A1}$, $L_{A2}$, $L_{B1}$, $L_{B2}$ and does not strike the lens 6 beyond an edge 16 of the corresponding lens segment $L_{A1}$, $L_{A2}$, $L_{B1}$, $L_{B2}$. In the present example, the lighting function segment 15 of the reflector surface $R_{A11}$, $R_{A12}$, and $R_{A13}$ is designed such that the light 7 reflected at the same strikes a first lens segment $L_{A1}$. The lighting function segment 15 of the reflector surface $R_{A2}$ is designed such that the light 7 reflected at the same strikes the second lens segment $L_{A2}$. The lighting function segments 15 of the reflector surfaces $R_{A11}$, $R_{A12}$, $R_{A13}$, and $R_{A2}$ are designed such that the light beam 7 emitted by the first light source 1 serves to create the low beam light distribution, which is projected into the vehicle near field by the light segments $L_{A1}$ and $L_{A2}$.

The reflector surfaces $R_{B1}$ and $R_{B2}$ are associated with the lens segments $L_{B1}$ and $L_{B2}$. The lighting function segments 15 of the reflector surfaces $R_{B1}$, $R_{B2}$ are designed such that the light beam of the first light source 1 striking them is deflected in accordance with a high beam light distribution and is projected into the vehicle near field via the lens segments $L_{B1}$, $L_{B2}$ to form the high beam light distribution.

If all first light sources 1 are switched on, then the entire area of the lens 6, namely the lens segments $L_{A1}$, $L_{A2}$, $L_{B1}$, $L_{B2}$, are illuminated and the low beam light distribution projected by the lens segments $L_{A1}$ and $L_{A2}$ is superimposed with the high beam light distribution projected by the lens segments $L_{B1}$ and $L_{B2}$.

Figure 2:
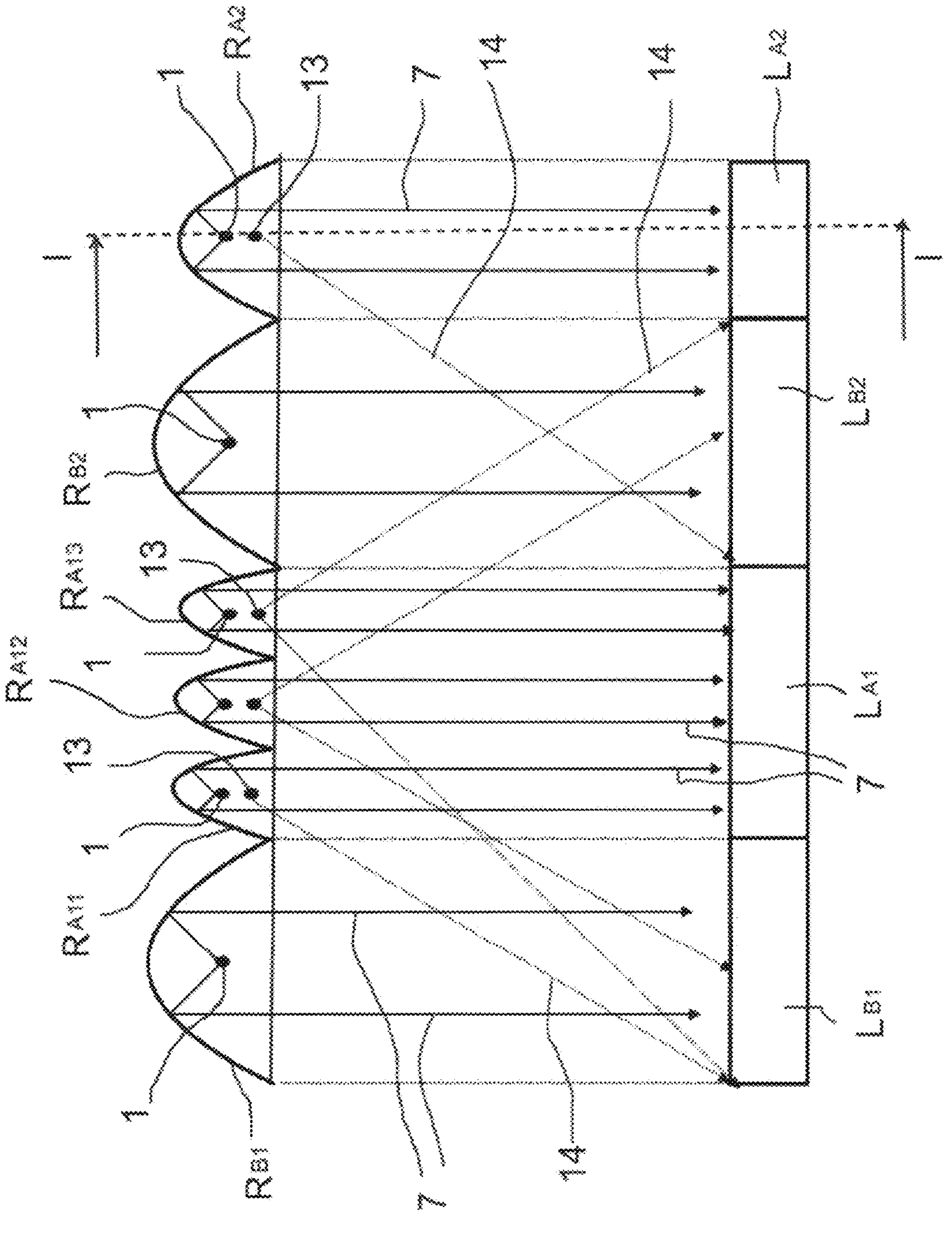
FIG. 2 shows a schematic top view of the lighting device.
Figure 3:
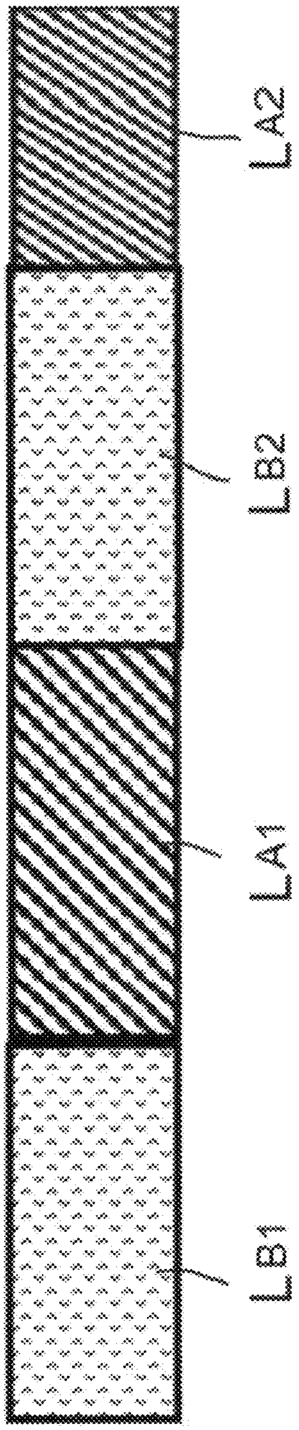
FIG. 3 shows a front view of a lens of the lighting device.

If the lighting device is not to serve to create a combined high beam/low beam light distribution, but instead only a low beam light distribution, then only the first light sources 1 associated with the first reflector surfaces $R_{A11}$, $R_{A12}$, $R_{A13}$, $R_{A2}$ are switched on, while the first light sources 1 associated with the second reflector surfaces $R_{B1}$ and $R_{B2}$ are switched off. In this case, only the lens segments $L_{A1}$ and $L_{A2}$ would be illuminated, while the lens segments $L_{B1}$ and $L_{B2}$ are not illuminated, see the dotted marking of the lens segments $L_{B1}$ and $L_{B2}$ in FIG. 2.

So that the entire lens 6 or the entire area of the lens 6, consequently also the lens segments $L_{B1}$ and $L_{B2}$, are illuminated in the operating condition of low beam light distribution, a second light source 13 is associated with the first reflector surfaces $R_{A11}$, $R_{A12}$, $R_{A13}$, $R_{A2}$; this second light source is arranged at a distance a from the first light source 1 and is located outside the focal point region 11. In the present example, the first light source 1 and the second light source 13 are arranged on a common printed circuit board 8.

The light or light beam 14 emitted by the second light source 13 strikes a diffused light segment 17, 17' of the reflector surface $R_{A11}$, $R_{A12}$, $R_{A13}$, or $R_{A2}$ so that it exits from the reflector 5 with a larger aperture angle than the light beams of the first light source 1 that are deflected by the lighting function segment 15 of the first reflector surface $R_{A11}$, $R_{A12}$, $R_{A13}$, $R_{A2}$. Via the diffused light segment 17 of the first reflector surfaces $R_{A11}$, $R_{A12}$, $R_{A13}$, $R_{A2}$, the light beam 14 is reflected in such a manner that it goes beyond the edge 16 of the lens segments $L_{A1}$, $L_{A2}$ associated with the respective first reflector surfaces $R_{A11}$, $R_{A12}$, $R_{A13}$, $R_{A2}$ and illuminates the adjacent lens segments $L_{B1}$, $L_{B2}$, with which the second reflector surfaces $R_{B1}$, $R_{B2}$ are associated. The light rays 14 that are sketched in FIG. 1 run past the lens segment $L_{A1}$ in the horizontal direction.

In the present example, the second light beam 14 is diffused in such a manner that the light 14 reflected by the outer reflector surfaces $R_{A11}$, $R_{A13}$ strikes the adjacent lens segments $L_{B1}$ and $L_{B2}$. Via the diffused light segment 17, 17' of the additional reflector surface $R_{A2}$, the light 14 is diffused in such a manner that it strikes the adjacent lens segment $L_{B2}$. As a result, it is ensured that the entire lens 6 is illuminated when the first light sources 1, with which the first reflector surfaces $R_{A11}$, $R_{A12}$, $R_{A13}$, $R_{A2}$ are associated, are switched on. The first light sources 1 and the second light sources 13, with which the first reflector surfaces $R_{A11}$, $R_{A12}$, $R_{A13}$, $R_{A2}$ are associated, are consequently switched on and off at the same time.

Alternatively, the second light sources 13 can also be switched off when the first light sources 1 associated with the second reflector surfaces $R_{B1}$, $R_{B2}$ are switched on. In this case, the lens segments $L_{B1}$ and $L_{B2}$ are illuminated by the corresponding light beams 7 of the reflector surfaces $R_{B1}$, $R_{B2}$ provided for the high beam light distribution.

In the present example, the printed circuit board 8 is arranged in the main direction of emission H of the lighting device. The printed circuit board 8 thus runs parallel to an optical axis 9 of the lens segments $L_{A1}$, $L_{A2}$.

The lens segments $L_{A1}$, $L_{A2}$, $L_{B1}$, $L_{B2}$ can be plano-convex in design, for example. On the light entry side, the lens segments $L_{A1}$, $L_{A2}$, $L_{B1}$, $L_{B2}$ can have diffuser elements, for example prismatic elements.

In the present example, the lens segments $L_{A1}$, $L_{A2}$, $L_{B1}$, $L_{B2}$ are joined to one another as a single piece.

In the present example, the reflector surfaces $R_{A11}$, $R_{A12}$, $R_{A13}$, $R_{A2}$, $R_{B1}$, $R_{B2}$ are joined to one another as a single piece.

According to an example of the invention, adjacent reflector surfaces $R_{A11}$, $R_{A12}$, $R_{A13}$, $R_{A2}$, $R_{B1}$, $R_{B2}$ and/or the lens segments $L_{A1}$, $L_{A2}$, $L_{B1}$, $L_{B2}$ can be arranged at a distance from one another.

As is evident from FIG. 1, the depicted lighting device has a first diffused light segment 17 in extension of the lighting function segment of the reflector surface $R_{A11}$, $R_{A12}$, $R_{A13}$, $R_{A2}$. Furthermore, the lighting device has a second diffused light segment 17', which is arranged on an opposite side from the first diffused light segment 17. The second diffused light segment 17' is arranged in the region of the printed circuit board 8 and oriented such that the light reflected by the first diffused light segment 17 is reflected yet again toward the lens segment $L_{A1}$, $L_{A2}$. In this way, a larger aperture angle or dispersion range in the vertical and/or horizontal directions is ensured.

In the present example, the reflector surfaces $R_{A11}$, $R_{A12}$, $R_{A13}$, $R_{A2}$, as well as lens segments $L_{A1}$, $L_{A2}$, that are associated with the different light distributions, namely low beam light distribution and high beam light distribution, are each arranged in alternation with one another.

According to an example of the invention, the reflector surfaces $R_{A11}$, $R_{A12}$, $R_{A13}$, $R_{A2}$ or lens segments $L_{A1}$, $L_{A2}$ associated with the low beam light distribution can also be arranged directly next to one another, while the reflector surfaces $R_{B1}$, $R_{B2}$ or lens segments $L_{B1}$, $L_{B2}$ are arranged vertically offset hereto.

According to an example of the invention, the lighting device has only the first diffused light segments 17, whereas the second diffused light segments 17' are omitted.

The first light sources 1 and the second light sources 13 preferably are designed as LED light sources.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A lighting device for vehicles comprising:

an optical unit that comprises a reflector with at least one reflector surface to create a specified light distribution;

a light source unit comprising a first light source that is arranged in a focal point region of the reflector surface, and a second light source that is arranged outside the focal point region of the reflector surface; and a lens arranged ahead of the reflector surface in a direction of light emission, the lens having lens segments, wherein the second light source is arranged outside the focal point region such that the light emitted by the second light source strikes a lens segment of the lens which a light emitted by the first light source and reflected by the reflector surface does not strike, so that all of the lens segments of the lens are illuminated, wherein the light emitted by the first light source strikes a lighting function segment of the reflector surface, wherein the light emitted by the second light source strikes a diffused light segment of the reflector surface, wherein the lighting function segment of the reflector surface is designed such that the light emitted by the first light source is reflected in accordance with the specified light distribution toward the lens segment at which the light emitted by the first light source is projected into a vehicle near field, and wherein the light emitted by the second light source is reflected by the reflector surface in a larger aperture angle than the light emitted by the first light source.

2. The lighting device according to claim 1, wherein the second light source is arranged at a distance from the first light source.

3. The lighting device according to claim 1, further comprising a second diffused light segment, wherein a portion of the light emitted by the second light source strikes the diffused light segment and then strikes the second diffused light segment, and wherein the second diffused light segment is a separate surface from the reflector surface.

4. The lighting device according to claim 1, wherein the lighting function segment of the reflector surface is designed such that the light emitted by the first light source, after being reflected, is not emitted beyond an edge of the lens segment associated with the reflector surface.

5. The lighting device according to claim 1, wherein the diffused light segment of the reflector surface is designed such that the light emitted by the second light source that is reflected at the diffused light segment is emitted beyond an edge of the lens segment associated with the reflector surface having the diffused light segment, wherein a different lens segment is illuminated that is associated with a further reflector surface, which is irradiated by a further first light source in order to create a further light distribution, and wherein a drive is arranged so that the second light source associated with the reflector surface is switched on when the first light source associated with the reflector surface is switched on for creating the specified light distribution and the further first light source associated with the further reflector surface is switched off for creating an additional light distribution.

6. The lighting device according to claim 1, wherein the reflector is arranged between the first light source and the second light source and the lens of the optical unit in the direction of light emission.

7. The lighting device according to claim 1, wherein the reflector surface and the lens are designed such that the specified light distribution is created.

8. The lighting device according to claim 1, wherein the first light source and the second light source are each designed as an LED light source, which are positioned on a common printed circuit board.

9. The lighting device according to claim 8, wherein the printed circuit board runs substantially parallel to an optical axis of the lens.

10. The lighting device according to claim 9, wherein the first light source and the second light source are arranged on a same surface of the printed circuit board.

11. A lighting device for vehicles comprising:

an optical unit that comprises a reflector with at least one reflector surface to create a specified light distribution;

a light source unit comprising a first light source that is arranged in a focal point region of the reflector surface, and a second light source that is arranged outside the focal point region of the reflector surface; and a lens arranged ahead of the reflector surface in a direction of light emission, the lens having lens segments, wherein the second light source is arranged outside the focal point region such that the light emitted by the second light source strikes a lens segment of the lens which a light emitted by the first light source and reflected by the reflector surface does not strike, so that all of the lens segments of the lens are illuminated, wherein the light emitted by the first light source strikes a lighting function segment of the reflector surface, wherein the light emitted by the second light source strikes a diffused light segment of the reflector surface, wherein the lighting function segment of the reflector surface is designed such that the light emitted by the first light source is reflected in accordance with the specified light distribution toward the lens segment at which the light emitted by the first light source is projected into a vehicle near field, and wherein the reflector further comprises multiple reflector surfaces and first light sources associated with each other are provided for creating first light beams, which are directed at different lens segments of the lens for creating a same light distribution and/or for creating different light distributions.

12. The lighting device according to claim 1, wherein the second light source is associated with the reflector surface that serves to create the specified light distribution and serves in combination with further reflector surfaces to create a different light distribution.

13. The lighting device according to claim 1, wherein a first reflector surface associated with the first light source and with the second light source, and a lens segment associated with the first reflector surface, serve to create a low beam light distribution.

14. The lighting device according to claim 13, wherein a second reflector surface that captures only the light of the first light source reflects the light that is projected by the lens segment associated with the second reflector surface to form a high beam light distribution that is superimposed with the low beam light distribution created by the first reflector surface and lens segment.

15. The lighting device according to claim 1, wherein the lens segments and/or the at least one reflector surface are joined to one another as a single piece in each case.

16. A lighting device for vehicles comprising:

an optical unit that comprises a reflector with at least one reflector surface to create a specified light distribution;

a light source unit comprising a first light source that is arranged in a focal point region of the reflector surface, and a second light source that is arranged outside the focal point region of the reflector surface; and a lens arranged ahead of the reflector surface in a direction of light emission, the lens having lens segments, wherein the second light source is arranged outside the focal point region such that the light emitted by the second light source strikes a lens segment of the lens which a light emitted by the first light source and reflected by the reflector surface does not strike, so that all of the lens segments of the lens are illuminated, wherein the light emitted by the first light source strikes a lighting function segment of the reflector surface, wherein the light emitted by the second light source strikes a diffused light segment of the reflector surface, and wherein the diffused light segment of the reflector surface is designed such that the light emitted by the second light source that is reflected at the diffused light segment is emitted beyond an edge of the lens segment associated with the reflector surface having the diffused light segment, wherein a different lens segment is illuminated that is associated with a further reflector surface, which is irradiated by a further first light source in order to create a further light distribution, and wherein a drive is arranged so that the second light source associated with the reflector surface is switched on when the first light source associated with the reflector surface is switched on for creating the specified light distribution and the further first light source associated with the further reflector surface is switched off for creating an additional light distribution.

* * * * *